Feb. 22, 1955  H. K. LINKS  2,702,535
PROCEDURE AND DEVICE FOR THE OPERATION
OF COMBUSTION ENGINES
Filed Nov. 18, 1950

INVENTOR
HEINRICH KARL LINKS
BY:
Haseltine, Lake & Co.
AGENTS

United States Patent Office 2,702,535
Patented Feb. 22, 1955

2,702,535

PROCEDURE AND DEVICE FOR THE OPERATION OF COMBUSTION ENGINES

Heinrich Karl Links, Stuttgart, Germany, assignor to Daimler-Benz Aktiengesellschaft, Stuttgart-Unterturkheim, Germany Application November 18, 1950, Serial No. 196,462

Claims priority, application Germany November 22, 1949

6 Claims. (Cl. 123—119)

The invention refers to a procedure and a device for the operation of combustion engines.

Combustion engines, which do not have superchargers associated therewith, have a characteristic volumetric efficiency, which decreases with increasing rates of revolutions. As soon as a certain number of revolutions is exceeded, the engine can as a result of the choking resistances no longer suck in enough air in order to effect a complete filling of the engine cylinder. It is true that this disadvantage can be removed by utilization of superchargers, which are superposed on the engine and convey the entire charging air to the latter under excess pressure; however, such a blower requires a considerable structural expense. The blower must, also at high numbers of revolution, be rated relatively large, so that the structural lay-out becomes relatively voluminous. Such an arrangement of the engine with supercharger can therefore practically only be applied to engines, which are designed for particularly high efficiency, and wherein the cost thereof plays a relatively subordinate role.

In contrast to this the object of the invention is to provide an engine that with relatively simple means achieves a relatively high volumetric efficiency, i. e. particularly in such a manner that a mode of operation, which unites the qualities of operation with supercharging and without supercharging. Accordingly it is therefore an essential characteristic of the invention that in addition to the air sucked in by the engine (whereby also a sucked in mixture or another medium, which corresponds to the effect of the air is to be understood) simultaneously air is introduced into the suction conduit under pressure.

According to a further characteristic of the invention at any time the volume of air added under pressure is that amount necessary for the complete or sufficient filling of the cylinder (whereby also a single cylinder may be understood) at all numbers of revolution, which are in question, while the main quantity of the air is sucked in by the engine itself as before.

As experience has shown, the normal entrance of air into the suction or intake conduit of the engine is not disturbed when a suitable arrangement for the introduction of compressed air into the suction conduit of the engine is provided, as the compressed air does not stream off to the outside through the open suction conduit, as could be supposed at first, but flows towards the engine together with the sucked in air and thereby makes feasible the improvement of the volumetric efficiency.

According to a further characteristic of the invention, to assist the entrance of air into the intake conduit the compressed air delivered by the additional blower is introduced into the suction conduit at a spot, at which relatively increased depression exists, preferably at an ejector nozzle, which is arranged in the suction conduit, or immediately behind it.

According to a further characteristic of the invention, simultaneously with the introduction of the compressed air also fuel can be introduced into the suction conduit at the feeding spot, for example by suction effect or by pressure. The additional blower can also, if occasion arises, deliver a fuel-air mixture instead of pure air.

According to a further characteristic at the entrance end of the suction conduit another nozzle is arranged to produce a decreased pressure there for encouraging the entrance of atmospheric air into the intake conduit.

Further details of the invention are illustrated by the following example of construction. The drawing shows in Figure 1 a diagram of the arrangement for a four cylinder engine with additional blower leading into the suction pipe.

Figure 3:
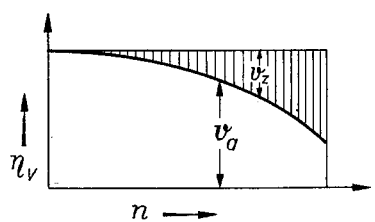
Figure 3 shows a diagram for the volumetric efficiency.

In Figure 3 the volumetric efficiency $\eta_v$ is plotted against the number of revolutions $n$. The sucked in air volume is marked by $v_a$. As shown in the diagram, the sucked in air volume decreases at first relatively slowly, however, at higher numbers of revolution relatively quickly. In order to maintain the original volumetric efficiency $\eta_v$, therefore the additional blower must deliver an air volume corresponding approximately to the variable factor $v_z$. Among other things it is also sufficient, when the efficiency is for the main part maintained.

Figure 1:
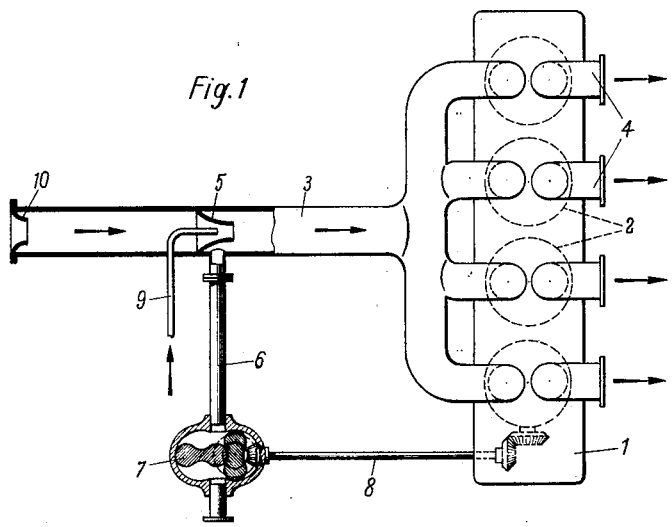

In Figure 1, 2 are the cylinders of the combustion engine 1, to which the air is conveyed by the suction pipe 3. The engine can be a Diesel engine, a carburetor engine or any other type of engine. The outlet pipes 4 can convey the exhaust gases of the engine separately or through a common exhaust gas manifold to the outside.

At a suitable location in the suction conduit, particularly at the spot of a depression, for example of a throttle valve or, as shown in Figure 1, immediately behind the Venturi nozzle 5, a branch pipe 6 discharges, and to which a blower, for example a Roots blower 7 is connected. The blower can be driven by the engine 1 independently or by suitable transmission members 8. Simultaneously fuel can also be sprayed in through a conduit 9 at the center of the Venturi nozzle 5.

Furthermore suitable arrangement is made for a further nozzle 10 at the entrance end of the suction conduit 5 to produce a lowered pressure at the entrance for encouraging the intake of atmospheric air.

Figure 2:
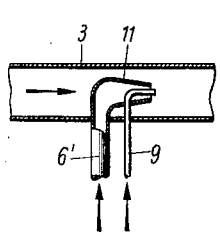
Figure 2 shows a somewhat different delivery of the additional air.

In the example of construction in accordance with Figure 2 the conduit 6, through which compressed air is introduced by a blower 7 into the suction conduit, discharges centrally into the latter within the suction conduit 3. whereby the fuel for example can be sucked into the conduit through the fuel conduit 9 within the nozzle shaped discharging hole 11 under the effect of the compressed air or it may also be sprayed in under pressure. The operation of the arrangement can after the aforesaid be seen without further explanation. The engine sucks in the combustion air through the nozzle 10 by the suction conduit 3. Simultaneously compressed air is pressed into the suction conduit 3 in the place of a depression (for example 5 or 11). The compressed air unites with the sucked in air and ensures that the engine cylinders obtain full and sufficient filling at higher numbers of revolution as well.

The nozzles 10 and 5 operate to prevent a return flow of the compressed air opposite to the direction of the arrow. If occasion arises, further nozzles or the like can be arranged in the suction conduit. The blower can run permanently, or only be switched in automatically or optionally at higher numbers of revolution by the worker or (in the case of application to motor vehicles or other vehicles) the driver. The blower in itself can be of any type. Advantageously, however, a blower, for example a Roots blower as in the example of construction is utilized, which conveys relatively small quantities of air at lower speeds and, at higher numbers of revolutionary relatively large quantities of air, so that a conveyor curve results, which adjusts as much as possible to the curve $v_z$. The blower can be rated considerably smaller than the hitherto utilized superchargers.

The invention is not restricted to the illustrated examples of construction, but can be varied at discretion within the bounds of the individual ideas of the invention.

What I claim is:

1. Apparatus for feeding at least an element of a combustible mixture to an internal combustion engine; comprising an intake conduit opening to the atmosphere at one end, a first nozzle member disposed within said conduit intermediate the length of the latter for producing a decreased pressure at its location, a branch conduit opening into said intake conduit at the location of said nozzle, means supplying compressed air to said branch conduit, a fuel supply duct opening into the intake conduit at the point of said first nozzle member, and a second nozzle disposed at said one end of the intake conduit for decreasing the pressure thereat.

2. In an internal combustion engine, a device comprising an intake duct communicating at one end with the outside air, through which air is sucked in by the engine, a branch duct leading into the intake duct intermediate the ends thereof, a Roots type blower in the branch duct driven by the engine for supplying air under pressure into the intake duct through the branch duct, the branch duct being normally constantly open between the blower and the intake duct, and a fuel supply duct opening into the intake duct at the point where the branch duct opens into the intake duct.

3. Device according to claim 2 further comprising means in the intake duct for producing a local low pressure of the air sucked in by the engine at the point where the branch duct opens into the intake duct.

4. Device according to claim 2 further comprising a venturi decreasing the cross-section of the intake duct, the branch duct opening into the intake duct at the point where a low pressure is caused by the venturi.

5. Device according to claim 4 comprising at least one further venturi preceding the aforementioned venturi in the intake duct.

6. Device according to claim 4 comprising a further venturi preceding the aforementioned venturi at the one end of the intake duct communicating with the outside air.

References Cited in the file of this patent

UNITED STATES PATENTS

| | | |
|---|---|---|
| 1,746,309 | Herier | Feb. 11, 1930 |
| 1,765,278 | Levergne | June 17, 1930 |
| 1,869,122 | Vincent | July 26, 1932 |
| 2,239,305 | Tacconi | Apr. 22, 1941 |

FOREIGN PATENTS

| | | |
|---|---|---|
| 771,613 | France | July 30, 1934 |